United States Patent
Compton et al.

(10) Patent No.: US 7,882,402 B2
(45) Date of Patent: Feb. 1, 2011

(54) APPARATUS, SYSTEM, AND METHOD FOR AUTOMATED ERROR PRIORITY DETERMINATION OF CALL HOME RECORDS

(75) Inventors: Matthew Charles Compton, Durham, NC (US); Louis Daniel Echevarria, Tuscon, AZ (US); Christine Lynette Telford, Tuscon, AZ (US); Richard Albert Welp, Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/203,668

(22) Filed: Sep. 3, 2008

(65) Prior Publication Data

US 2010/0058122 A1   Mar. 4, 2010

(51) Int. Cl.
    *G06F 11/00* (2006.01)
(52) U.S. Cl. ...................................................... 714/49
(58) Field of Classification Search ................. 714/2–5, 714/15, 18, 19, 25–27, 37–39, 45–49, 57
See application file for complete search history.

(56) References Cited

U.S. PATENT DOCUMENTS

| | | | |
|---|---|---|---|
| 4,422,158 A * | 12/1983 | Galie | 1/1 |
| 6,324,659 B1 | 11/2001 | Pierro | |
| 6,650,949 B1 * | 11/2003 | Fera et al. | 700/79 |
| 6,721,685 B2 | 4/2004 | Kodama | |
| 6,754,704 B1 | 6/2004 | Prorock | |
| 7,002,914 B2 * | 2/2006 | Cloonan | 370/232 |
| 7,043,505 B1 * | 5/2006 | Teague et al. | 1/1 |
| 7,225,368 B2 * | 5/2007 | Lancaster | 714/48 |
| 7,287,193 B2 * | 10/2007 | Ward | 714/43 |
| 2003/0189930 A1 * | 10/2003 | Terrell et al. | 370/389 |
| 2004/0078724 A1 | 4/2004 | Keller et al. | |
| 2004/0230873 A1 | 11/2004 | Ward | |
| 2004/0255004 A1 | 12/2004 | Weseloh | |
| 2006/0070077 A1 * | 3/2006 | Erlandson et al. | 718/104 |
| 2008/0065577 A1 | 3/2008 | Chefalas et al. | |
| 2008/0133435 A1 | 6/2008 | Chintalapti et al. | |
| 2008/0320338 A1 | 12/2008 | Ward | |
| 2010/0058117 A1 * | 3/2010 | Compton et al. | 714/48 |

* cited by examiner

*Primary Examiner*—Nadeem Iqbal
(74) *Attorney, Agent, or Firm*—Kunzler Needham Massey & Thorpe

(57) ABSTRACT

An apparatus, system, and method are disclosed for data priority determination. A receiving module receives a data package. A parsing module parses out priority indicators from the data package. A comparison module compares the priority indicators to entries in a priority matrix, determining whether the data package is of a defined data package type. In response to a determination that the data package is of the defined data package type, a priority determination module determines a data package priority of the data package based on a data package priority of the defined data package type. In response to a determination that the data package is not of the defined data package type, a type definition module defines a new data package type having a data package priority based on the priority indicators. A priority update module updates the data package priority of the defined data package type.

20 Claims, 4 Drawing Sheets

APPARATUS, SYSTEM, AND METHOD FOR AUTOMATED ERROR PRIORITY DETERMINATION OF CALL HOME RECORDS

BACKGROUND OF THE INVENTION

1. Field of the Invention

This invention relates to priority determination of data and more particularly relates to automated priority determination of call home records.

2. Description of the Related Art

Many electronic and computer devices send data to a central data repository. A wide variety of data is sent to central repositories, such as error reports, status reports, statistical reports, transactional information, sensor readings, and the like. As the number of devices that send data packages to a central location increases, the number of data packages also increases. Some data packages may be urgent, requiring immediate attention, while others may require little or no attention at all.

Currently, those wishing to access data packages within the central data repository often spend large amounts of time sifting through data packages searching for high priority data packages, or for previously identified data packages. Systems with many call home devices, or with years of call home data, make this manual searching nearly impossible. Even in situations where manual searching is possible, manual searches can miss critical information, and users may have differing opinions as to the priority or the severity of data. Manual searches through data packages waste time and allow important data to be missed.

Additionally, many call home enabled devices have only limited connections to the central data repository. These devices may only have access to dialup connections, or may gather data packages from other call home enabled devices to send at one time. With either a slow connection, or with a large amount of data to transmit, more important data packages may be delayed while less important data packages are being transmitted. Even if call home enabled devices were to prioritize their call home packages, they only have access to the call home packages that they have collected, and cannot calculate a system-wide priority. The opportunity to load system-wide priorities traditionally only presents itself when microcode is loaded onto a call home enabled device. Loading microcode is typically an infrequent and often lengthy process.

SUMMARY OF THE INVENTION

From the foregoing discussion, it should be apparent that a need exists for an apparatus, system, and method that determine a priority of a data package. Beneficially, such an apparatus, system, and method would automatically determine and update a priority of a data package and would classify data packages by data package type.

The present invention has been developed in response to the present state of the art, and in particular, in response to the problems and needs in the art that have not yet been fully solved by currently available call home systems. Accordingly, the present invention has been developed to provide an apparatus, system, and method for prioritizing data that overcome many or all of the above-discussed shortcomings in the art.

The apparatus for data priority determination is provided with a plurality of modules configured to functionally execute the necessary steps of data priority determination. These modules in the described embodiments include a receiving module, a parsing module, a comparison module, a priority determination module, a priority update module, a type definition module, a linking module, a trigger module, a frequency module, a user access priority module, a user rating module, a last access module, and a priority override module.

In one embodiment, the receiving module receives a data package. The parsing module, in one embodiment, parses out one or more priority indicators from the data package. At least one of the one or more priority indicators, in one embodiment, are selected from the group consisting of an identification number, an online/offline status, and a failed component identifier The comparison module, in one embodiment, compares the one or more priority indicators to entries in a priority matrix. In a further embodiment, the comparison module determines whether the data package is of a defined data package type. The comparison module, in one embodiment, determines whether the data package is of the defined data package type using a predefined matching threshold.

In one embodiment, the priority determination module determines a data package priority of the data package based on a data package priority of the defined data package type in response to a determination by the comparison module that the data package is of the defined data package type. The priority update module, in one embodiment, updates the data package priority of the defined data package type.

The type definition module, in one embodiment, defines a new data package type having a data package priority in response to a determination by the comparison module that the data package is not of the defined data package type. In a further embodiment, the data package priority is based on the one or more priority indicators.

In one embodiment, the linking module links multiple data packages of the defined data package type to each other such that each of the multiple data packages are accessible to a user accessing another of the multiple data packages. In another embodiment, the trigger module performs a predefined action in response to a determination that the data package has a predefined data package priority.

In one embodiment, the frequency module updates the data package priority of the defined data package type based on a number of received data packages of the defined data package type. The user access priority module, in one embodiment, updates the data package priority of the defined data package type based on a number of times that data packages of the defined data package type have been accessed by one or more users.

In a further embodiment, the user rating module updates the data package priority of the defined data package type based on one or more user supplied data package priorities. In another embodiment, the last access module updates the data package priority of the defined data package type based on an amount of time that has transpired since a data package of the defined data package type has been accessed.

The priority override module, in one embodiment overrides the data package priority of the defined data package type. The priority override module, in another embodiment, lowers the data package priority in response to a false error designation. In a further embodiment, the priority override module increases the data package priority in response to a severe error designation. The priority override module, in one embodiment, overrides the data package priority with a user supplied priority.

A system of the present invention is also presented for prioritization of call home packages. The system may be embodied by one or more data package sources, a priority matrix, a data prioritization module, a data package repository, and a user interface.

The one or more data package sources, in one embodiment, collect call home data compile the call home data into a call home package. In one embodiment, the priority matrix stores priority indicating data corresponding to one or more defined call home package types.

The data prioritization module, in one embodiment, receives the call home package, parses out one or more priority indicators from the call home package, compares the one or more priority indicators to the priority indicating data in the priority matrix, determines a call home package priority based on the one or more priority indicators and on the priority matrix, and updates the priority matrix based on the call home package. In another embodiment, the data prioritization module determines whether the call home package is of a defined call home package type, and defines a new call home package type comprising the call home package priority in response to a determination that the call home package is not of the defined call home package type.

In one embodiment, the data package repository receives and stores multiple call home packages from the data prioritization module. The user interface, in one embodiment, provides a user access to the multiple call home packages stored in the data package repository.

A method of the present invention is also presented for error determination of call home records. Another method is presented for providing an error determination service to a customer over a network. The methods in the disclosed embodiments substantially include the steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
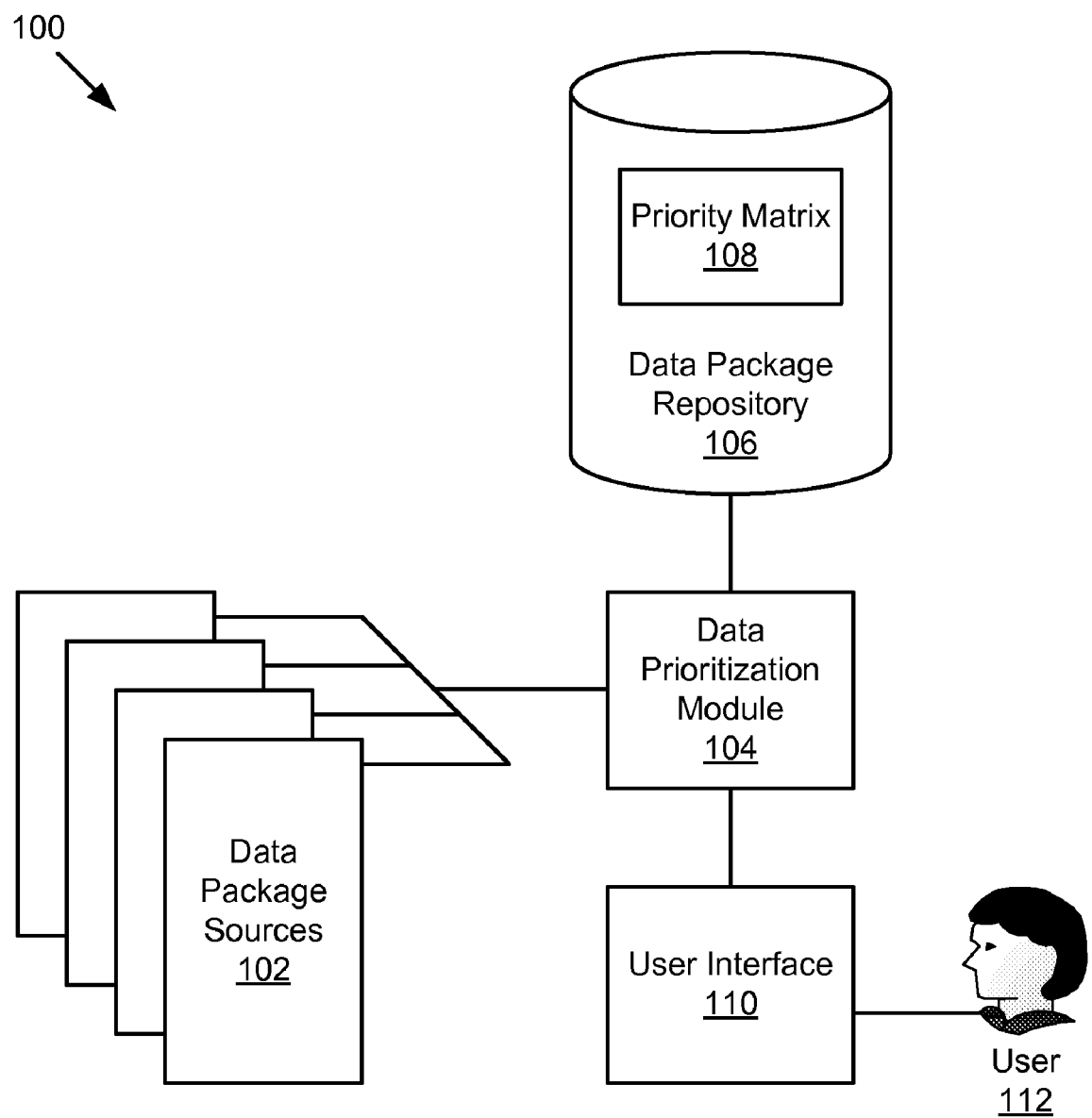
FIG. 1 is a schematic block diagram illustrating one embodiment of a system for automated priority determination of data packages in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for automated priority determination of data packages. In the depicted embodiment, the system 100 comprises one or more data package sources 102, a data prioritization module 104, a data package repository 106, a priority matrix 108, a user interface 110, and a user 112.

In one embodiment, the one or more data package sources 102 are configured to compile, collect, gather, transfer, or otherwise provide data packages. A data package, in one embodiment, may comprise a report, an update, a request, a status, or other data that is packaged for transmission over a network. A data package, in a further embodiment, may comprise a call home package that is transmitted from a remote system or device, such as the one or more data package sources 102, to a central system, device, repository, or the like. Data packages may comprise predefined formats to facilitate processing of the data packages by the data prioritization module 104. The one or more data package sources 102, in another embodiment, may collect data and assemble the data into a data package, such as a call home package.

One example of a call home package is an error package. A remote system, such as the data package sources 102, may send an error package to report an error to a central system, such as the data prioritization module 104 or a similar module. Error packages may comprise one or more of an error log, an error identifier, a system health report, a system online/offline status, a failed module identifier, or other error information. Some data packages, such as error packages, may vary in urgency and required responses, some having an extreme urgency and requiring an immediate response, while others may have minimal urgency and require little or no response. Data packages may be prioritized according to urgency, severity, importance, relevance, or other factors. The one or more data package sources 102 may transmit the data packages based on a data package priority. The one or more data package sources 102, in one embodiment, may comprise one or more customers that send data packages to a central service provider, such as the data prioritization module 104.

The one or more data package sources 102, in one embodiment, send one or more data packages to the data prioritization module 104, either directly or indirectly. Each of the data package sources 102 may send data packages individually, or alternatively, may group them together for transmission. For example, some of the one or more data package sources 102 may be designated to transmit data packages on behalf of others of the one or more data package sources 102. Accordingly, the one or more data package sources 102 may be in electrical communication with each other, or divided into subgroups that are in electrical communication with each other. The one or more data package sources 102, in one embodiment, may comprise computer systems such as personal computers (PCs) or servers, embedded systems or control systems, or other sources capable of generating and/or transmitting a data package. In one embodiment, the one or more data package sources 102 may send one or more data packages to the data prioritization module 104 in groups, for example at a specific interval or time, or when the one or more data package sources 102 accumulate a predetermined amount of data packages.

In one embodiment, the data prioritization module 104 receives one or more data packages from the data package sources 102. One example of the data prioritization module 104 is described in greater detail with regard to FIG. 2. In general, the data prioritization module 104 may be configured to receive a data package, to parse out one or more priority indicators from the data package, to compare the one or more priority indicators to priority indicating data in the priority matrix 108, to determine a data package priority based on the one or more priority indicators and on the priority matrix 108, and to update the priority matrix based on the data package. The data prioritization module 104 may be further configured to determine whether the data package is of a defined data package type, and to define a new data package type comprising the data package priority in response to a determination that the data package is not of the defined data package type.

In one embodiment, the data package repository 106 is configured to receive and to store multiple data packages from the data prioritization module 104. The data package repository 106 may comprise one or more data structures, database tables, files, or the like that are stored on one or more computer readable media. The data package repository 106, in one embodiment, may store entire data packages, or may store selected data from or information about the data packages.

In one embodiment, the priority matrix 108 comprises priority indicating data corresponding to one or more defined data package types. The priority matrix 108 may be stored in the data package repository 106, or on one or more other computer readable media. The priority indicating data, in one embodiment, comprises data that the data prioritization module 104 parsed from one or more data packages. The priority indicating data may correspond to data package types defined by the data prioritization module 104, such that the data prioritization module 104 may compare data from a data package to the priority indicating data in the priority matrix 108 to determine whether the data package is of a defined data package type.

The priority matrix 108, in a further embodiment, may comprise a current data package priority corresponding to each defined data package type. In another embodiment, the priority matrix 108 may comprise priority indicating data and data package types, and the data prioritization module 104 may use the data package types to otherwise access or retrieve a current data package priority corresponding to a specific data package type. In one embodiment, the priority matrix 108 comprises one or more received data packages corresponding to each defined data package type.

The data prioritization module 104, in one embodiment, may determine, update, or otherwise change the data stored in the priority matrix 108. The priority matrix 108, in one embodiment, may comprise rows of data, for example a row of priority indicating data or ranges of data for each defined data package type. In another embodiment, the priority matrix 108 may comprise a tree structure, for example a decision tree of priority indicating data or ranges of data that the data prioritization module 104 may traverse to determine a data package type. In other embodiments, the priority matrix 108 may comprise another data structure, such as a matrix, list, array, set, map, graph, or the like.

In one embodiment, the user interface 110 provides the user 112 access to data packages stored in the data package repository 106. The user interface 110 may allow the user 112 to link from one data package of a data package type to other data packages of the data package type. The user interface 110, in another embodiment, may also provide the user 112 access to other information from the data prioritization module 104 and/or the data package repository 106, and may allow the user 112 to input data to the data prioritization module 104 or the data package repository 106. The user interface 110 may comprises a graphical user interface (GUI), a text interface, or another interface type. The user 112, in various embodiments, may access the user interface 112 from a single location, from a remote connection, from a local network, from the Internet, and/or from other locations.

In one embodiment, the user 112 is authorized to access the user interface 110. The user 112 may comprise an administrator of the system 100, a technician or support staff assigned to troubleshoot or repair the data package sources 102, a customer that owns, leases, rents, or uses the data package sources 102, or another interested, qualified, and/or authorized party.

Figure 2:
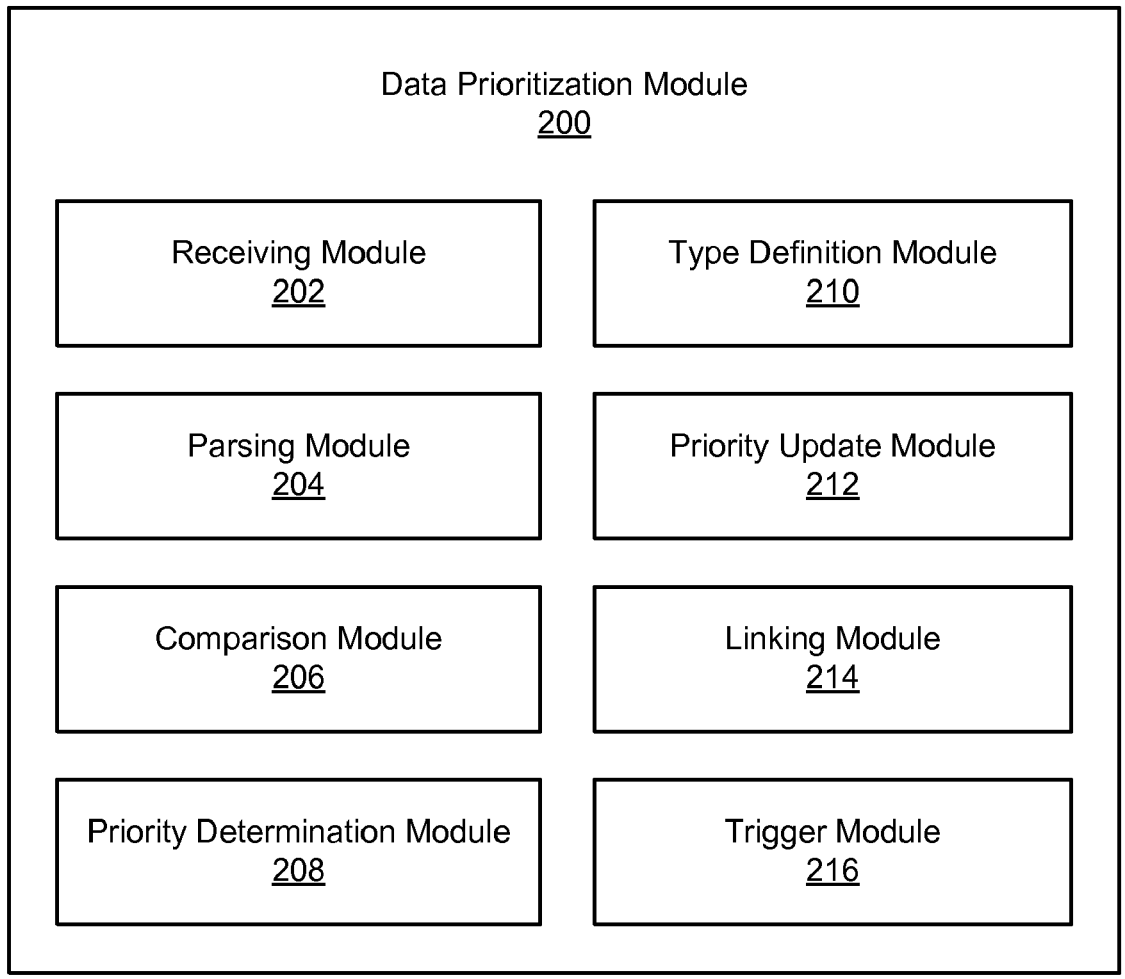
FIG. 2 is a schematic block diagram illustrating one embodiment of a data prioritization module in accordance with the present invention.

FIG. 2 depicts one embodiment of a data prioritization module 200. In the depicted embodiment, the data prioritization module 200 comprises a receiving module 202, a parsing module 204, a comparison module 206, a priority determination module 208, a type definition module 210, a priority update module 212, a linking module 214, and a trigger module 216.

In one embodiment, the receiving module 202 is configured to receive data packages. The receiving module 202 may receive the data packages over a network interface, over a direct connection, or over another communications interface. The receiving module 202 may receive data packages directly from originating data package sources and/or relayed through one or more other data package sources or the like. In a further embodiment, the receiving module 202 may receive data packages in a predefined priority order. In one embodiment, the data prioritization module 200 is configured to define the predefined priority order, and may communicate the predefined priority order to one or more data package sources.

In one embodiment, the parsing module 204 parses out one or more priority indicators from a data package. Priority indicators, in one embodiment, may comprise data from a data package that denotes a priority of the data package. Identification numbers, status indicators such as a device or module online/offline status, failed component identifiers, and the like are non-limiting examples of priority indicators. In one embodiment, the parsing module 204 parses or selects each data segment of a data package as priority indicators. In another embodiment, the parsing module 204 parses or selects a predefined subset of data segments of a data package as priority indicators. In a further embodiment, the parsing module 204 parses priority indicators out from individual data segments of a data package, for example searching for one or more predetermined words, phrases, numbers, symbols, or the like within a data segment. Priority indicators, in another embodiment, comprise key information that identifies a data package type.

In one embodiment, the comparison module 206 compares one or more priority indicators from a data package to entries in a priority matrix to determine whether the data package is of a defined data package type. The comparison module 206 may compare the one or more priority indicators to entries in the priority matrix by performing one or more searches, database queries, tree traversals, or the like. The comparison module 206, in a further embodiment, uses a predefined matching threshold to determine whether the data package is of the defined data package type. The predefined matching threshold may comprise a number of matches between priority indicators from the data package and entries in the priority matrix, one or more matching ranges, wherein a priority indicator matches a priority matrix entry if it falls within a matching range corresponding to the priority matrix entry, or other predefined matching thresholds. For example, in one embodiment, the comparison module 206 may match an identification number, a sensor reading, or another priority indicator to an entry in the priority matrix if it falls within a range of identification numbers, a range of sensor readings, or the like. In another embodiment, the comparison module 206 may determine that the data package is of a defined data package type if a predetermined percentage or a predetermined number of priority indicators match entries in the priority matrix.

In one embodiment, the priority determination module 208 determines a data package priority of a data package. The data package priority, in one embodiment, may comprise an absolute priority, such as a priority level in a tiered priority scale. Each priority level in a tiered priority scale may comprise an identifier, such as a number, letter, symbol, color, or the like to represent the priority level. In another embodiment, the data package priority may comprise a relative priority, such as an ordered ranking of data packages or data package types. The priority determination module 208, in one embodiment, may base the data package priority on a corresponding data package priority of a defined data package type from a priority matrix. For example, a priority matrix may comprise a data package priority corresponding to each defined data package type in the priority matrix. In another embodiment, the priority determination module 208 may retrieve a data package priority corresponding to a defined data package type from a data storage, or the like. The priority determination module 208, in one embodiment, may determine the data package priority in response to a determination by the comparison module 206 that the data package is of a defined data package type.

In one embodiment, the type definition module 210 defines one or more new data package types. The type definition module 210 may define the new data package type in response to a determination by the comparison module 206 that a data package is not of a defined data package type or in response to a request from a user or from another module. The type definition module 210, in one embodiment, may define the one or more new data package types using one or more priority indicators from the data package. For example, the type definition module 210 may define a new data package type by adding the one or more priority indicators corresponding to the data package type as entries in a priority matrix, the entries comprising a new data package type.

The type definition module 210, in a further embodiment, may define a data package priority for each of the one or more new data package types. The type definition module 210 may base a data package priority for a new data package type on an analysis of one or more priority indicators, on a predefined default priority, on an average data package priority, or on other factors. The type definition module 210 may base the data package priority on one or more priority indicators by comparing the one or more priority indicators to entries in a priority matrix, by receiving a user evaluation of the one or more priority indicators, by using a data package priority of a near match data package type of the one or more priority indicators, by comparing the one or more priority indicators to one or more predefined thresholds, or by otherwise using the one or more priority indicators.

Figure 3:
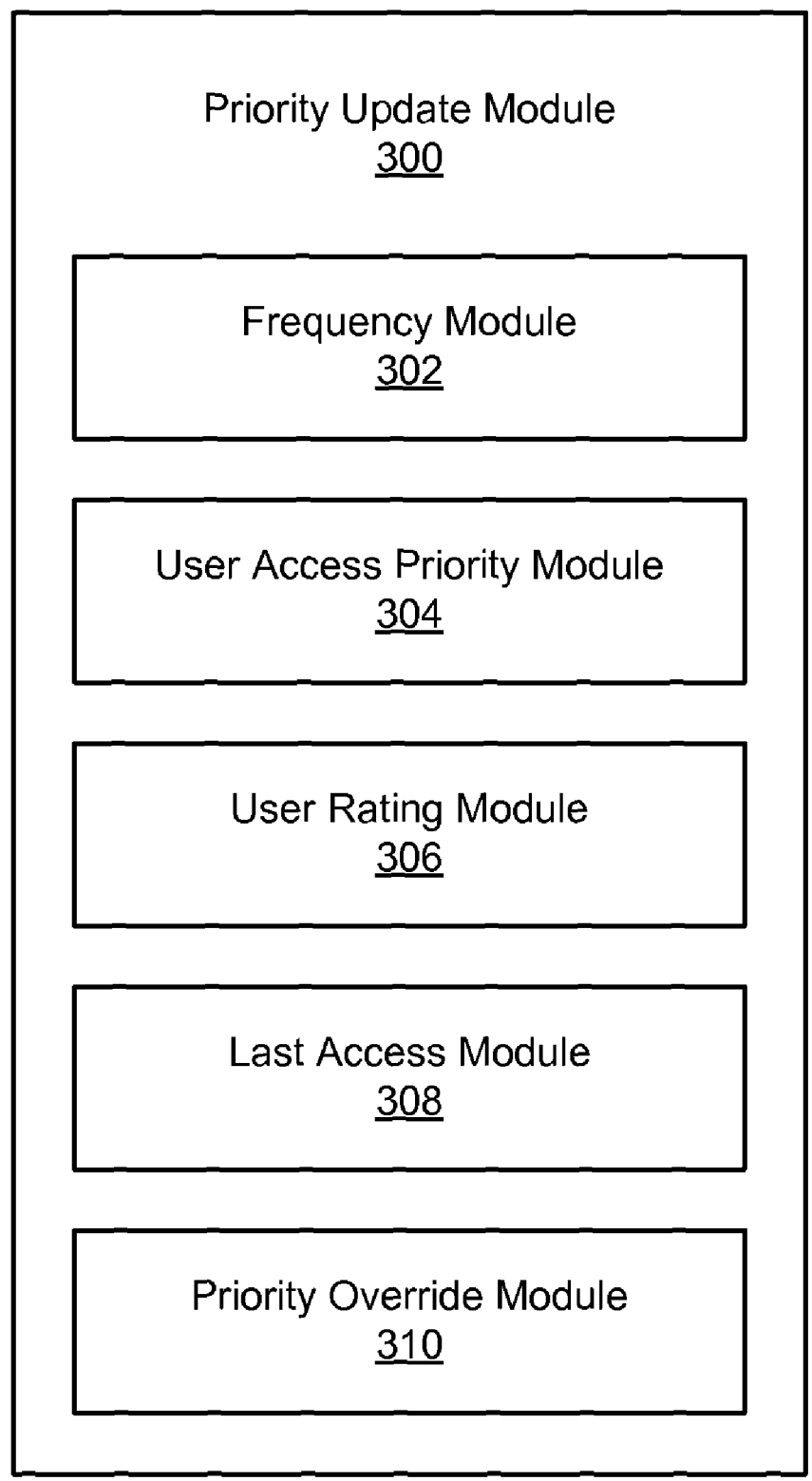
FIG. 3 is a schematic block diagram illustrating one embodiment of a priority update module in accordance with the present invention.

One embodiment of the priority update module 212 is described in greater detail with regard to the priority update module 300 of FIG. 3. In general, the priority update module 212 updates a data package priority of a defined data package type. The priority update module 212, in one embodiment, updates the data package priority based on one or more of a frequency that data packages of the defined data package type are received, a number of times that users have accessed data packages of the defined data package type, a user rating, a last time that a user accessed a data package of the defined data package type, a data package priority override, and/or other priority factors. The priority update module 212 may update the data package priority of the defined data package type in a priority matrix, in a data storage, or the like.

In one embodiment, the linking module 214 links multiple data packages of a defined data package type to each other. In a further embodiment, the linking module 214 links the multiple data packages such that each of the multiple data packages are accessible to a user accessing a member of the multiple data packages. The linking module 214 may link the multiple data packages using a data structure, or the like. The linking module 214, in another embodiment, may provide access to the multiple data packages using lists, links, tabs, or the like within a graphical user interface (GUI), using an application programming interface (API), using a command line interface, or by otherwise providing access to the multiple data packages.

In one embodiment, the trigger module 216 performs a predefined action in response to a determination by the priority determination module 208, the type definition module 210, or another module, that a data package has a predefined data package priority. Non-limiting examples of predefined actions include notifying a user, notifying another module, performing a diagnosis action, performing a support or repair action, performing a database action, executing a program or a script, and other triggerable actions.

FIG. 3 depicts one embodiment of a priority update module 300 that may be substantially similar to the priority update module 212 of FIG. 2. The priority update module 300, in one embodiment, updates a data package priority of a defined data package type. In the depicted embodiment, the priority update module 300 comprises a frequency module 302, a user access priority module 304, a user rating module 306, a last access module 308, and a priority override module 310. Each of the frequency module 302, the user access priority module 304, the user rating module 306, the last access module 308, and the priority override module 310, in one embodiment, may update the data package priority individually, or may cumulatively provide factors for the priority update module 300 to use in updating the data package priority.

In one embodiment, the frequency module 302 updates a data package priority of a defined data package type based on a number of data packages of the defined data package type received. The frequency module 302 may update the data package priority based on a percentage of a total number of data packages received that are of the defined data package type, based on one or more predefined thresholds, based on a predefined scale for each received data package of the data package type, or may otherwise factor the number of data packages of the defined data package type received into the data package priority. In one embodiment, the frequency module 302 increases the data package priority as the number of data packages of the defined data package type that are received increases.

In one embodiment, the user access priority module 304 updates a data package priority of a defined data package type based on a number of times that users have accessed data packages of the defined data package type. The user access priority module 302 may update the data package priority based on a percentage of a total number of user accesses in which users accessed data packages of the defined data package type, based on one or more predefined thresholds, based on a predefined scale for each user access of a data package of the data package type, or may otherwise factor the number of times that users have accessed data packages of the defined data package type into the data package priority. In one embodiment, the user access priority module 304 increases the data package priority as the number of times that users access data packages of the defined data package type increases.

In one embodiment, the user rating module 306 updates a data package priority of a defined data package type based on one or more user supplied data package priorities. The user rating module 306 may update the data package priority based on an average or other combination of multiple user supplied data package priorities or ratings, based on a single user's data package priority or rating, or may otherwise factor one or more user supplied data package priorities into the data package priority.

In one embodiment, the last access module 308 updates a data package priority of a defined data package type based on an amount of time that has transpired since a data package of the defined data package type has been accessed. An access, in one embodiment, comprises a user access. In another embodiment, an access may comprise a user access, a module access, or another access of a data package of the defined data package type. The last access module 308 may update the data package priority based on one or more predefined thresholds, based on a predefined scale for each passing of a selected time division that transpires without an access of a data package of the data package type, or may otherwise factor the amount of time that has transpired since a data package of the defined data package type has been accessed into the data package priority. In one embodiment, the last access module 308 decreases the data package priority as the amount of time that has transpired since a data package of the defined data package type has been accessed increases.

In one embodiment, the priority override module 310 overrides a data package priority of a defined data package type. The priority update module 300, in one embodiment, allows the priority override module 310 to override or supersede priority updates of other modules. In one embodiment, the priority override module 310 is configured to receive a user supplied priority, or a priority from another module. For example, a user, another module, or the like may designate a static data package priority for a defined data package type, designate a defined data package type as a false error, and/or designate a defined data package type as a severe error. In a further embodiment, the priority override module 310 lowers the data package priority in response to a false error designation. In another embodiment, the priority override module 310 increases the data package priority in response to a severe error designation.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
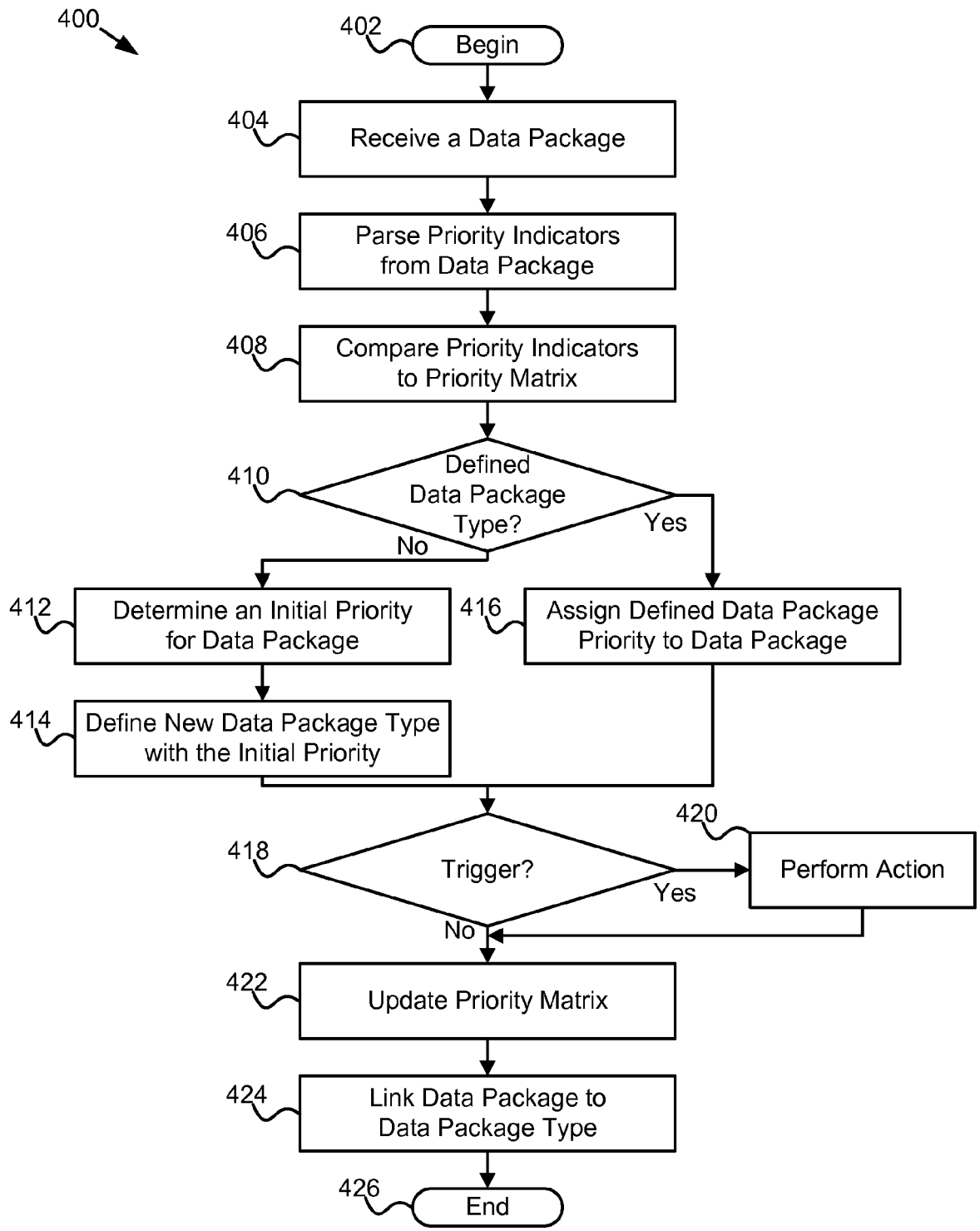
FIG. 4 is a schematic flow chart diagram illustrating one embodiment of a method for automated priority determination of data packages in accordance with the present invention.

FIG. 4 depicts one embodiment of a method 400 for automated priority determination of data packages. In one embodiment, the method 400 may be for providing an error prioritization service to a customer over a network. The method 400 begins 402, and the receiving module 202 receives 404 a data package from the one or more data package sources 102. The data package, in one embodiment, comprises a call home package. The one or more data package sources 102, in a further embodiment, may comprise a customer.

The parsing module 204 parses 406 one or more priority indicators from the data package. The one or more priority indicators, in one embodiment, comprise error priority indicators. The comparison module 206 compares 408 the one or more priority indicators to one or more entries in the priority matrix 108. The comparison module 206 determines 410 whether the data package is of a defined data package type. In one embodiment, defined data package types comprise error package types.

In response to a determination 410 by the comparison module 206 that the data package is not of a defined data package type, the type definition module 210 determines 412 an initial data package priority of the data package and defines 414 a new data package type comprising the initial data package priority. The initial data package priority, in one embodiment, comprises an error package priority. In response to a determination 410 by the comparison module 210 that the data package is of a defined data package type, the priority determination module 208 assigns 416 the defined data package type and/or a data package priority corresponding to the defined data package type to the data package.

The trigger module 216 determines 418 whether there is a trigger action associated with the defined data package type and/or with the priority of the data package, and performs 420 the trigger action when one exists. The type definition module 210 and/or the priority update module 300 update 422 the priority matrix 108. The type definition module 210 may update 422 the priority matrix 108 with new entries defining a new data package type. The priority update module 300 may update 422 the priority matrix 108 with one or more updated data package priorities.

The linking module 214 links 424 the data package to other data packages of the data package type. In one embodiment, the linking module 214 links 424 the data package to other data packages such that the other data packages are accessible to a user such as a customer when viewing the data package through a user interface. The method 400 ends 426.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for data priority determination, the apparatus comprising:

a receiving module configured to receive a data package;

a parsing module configured to parse out one or more priority indicators from the data package;

a comparison module configured to compare the one or more priority indicators to entries in a priority matrix to determine whether the data package is of a defined data package type;

a priority determination module configured to determine a data package priority of the data package based on a data package priority of the defined data package type in response to a determination by the comparison module that the data package is of the defined data package type; and a priority update module configured to update the data package priority of the defined data package type.

2. The apparatus of claim 1, further comprising a type definition module configured to define a new data package type having a data package priority in response to a determination by the comparison module that the data package is not of the defined data package type, the data package priority based on the one or more priority indicators.

3. The apparatus of claim 1, further comprising a linking module configured to link multiple data packages of the defined data package type to each other such that each of the multiple data packages are accessible to a user accessing another of the multiple data packages.

4. The apparatus of claim 1, further comprising a trigger module configured to perform a predefined action in response to a determination that the data package has a predefined data package priority.

5. The apparatus of claim 1, wherein the priority update module comprises a frequency module configured to update the data package priority of the defined data package type based on a number of received data packages of the defined data package type.

6. The apparatus of claim 1, wherein the priority update module comprises a user access priority module configured to update the data package priority of the defined data package type based on a number of times that data packages of the defined data package type have been accessed by one or more users.

7. The apparatus of claim 1, wherein the priority update module comprises a user rating module configured to update the data package priority of the defined data package type based on one or more user supplied data package priorities.

8. The apparatus of claim 1, wherein the priority update module comprises a last access module configured to update the data package priority of the defined data package type based on an amount of time that has transpired since a data package of the defined data package type has been accessed.

9. The apparatus of claim 1, wherein the priority update module comprises a priority override module configured to override the data package priority of the defined data package type.

10. The apparatus of claim 9, wherein the priority override module is further configured to lower the data package priority in response to a false error designation.

11. The apparatus of claim 9, wherein the priority override module is further configured to increase the data package priority in response to a severe error designation.

12. The apparatus of claim 9, wherein the priority override module is further configured to override the data package priority with a user supplied priority.

13. The apparatus of claim 1, wherein the comparison module determines whether the data package is of the defined data package type using a redefined matching threshold.

14. A system for prioritization of call home packages, the system comprising:

one or more data package sources configured to collect call home data and to compile the call home data into a call home package;

a priority matrix configured to store priority indicating data corresponding to one or more defined call home package types;

a data prioritization module configured to receive the call home package, to parse out one or more priority indicators from the call home package, to compare the one or more priority indicators to the priority indicating data in the priority matrix, to determine a call home package priority based on the one or more priority indicators and on the priority matrix, and to update the priority matrix based on the call home package;

a data package repository configured to receive and store multiple call home packages from the data prioritization module; and a user interface configured to provide a user access to the multiple call home packages stored in the data package repository.

15. The system of claim 14, wherein the data prioritization module is further configured to determine whether the call home package is of a defined call home package type, and to define a new call home package type comprising the call home package priority in response to a determination that the call home package is not of the defined call home package type.

16. A computer program product comprising a computer readable storage medium having computer usable program code executable to perform operations for error determination of call home records, the operations of the computer program product comprising:

receiving a call home package;

parsing out one or more priority indicators from the call home package;

comparing the one or more priority indicators to entries in a priority matrix;

determining whether the call home package is of a defined error package type;

determining an error package priority of the call home package based on a error package priority of the defined error package type in response to a determination that the call home package is of the defined error package type; and defining a new error package type having an error package priority in response to a determination that the call home package is not of the defined error package type, the error package priority based on the one or more priority indicators.

17. The computer program product of claim 16, further comprising updating the error package priority of the defined error package type based on the call home package.

18. The computer program product of claim 16, wherein at least one of the one or more priority indicators are selected from the group consisting of an identification number, an online/offline status, and a failed component identifier.

19. A method of providing an error determination service to a customer over a network, the method comprising:

receiving a call home package from a customer;

parsing out one or more error priority indicators from the call home package;

comparing the one or more error priority indicators to entries in a priority matrix;

determining whether the call home package is of a defined error package type;

determining an error package priority of the call home package based on a error package priority of the defined error package type in response to a determination that the call home package is of the defined error package type; and linking the call home package to one or more other call home packages of the defined error package type such that the one or more other call home packages are accessible to the customer when viewing the call home package through a user interface.

20. The method of claim 19, wherein the method comprises defining a new error package type having an error package priority in response to a determination that the call home package is not of the defined error package type, the error package priority based on the one or more priority indicators.

* * * * *